United States Patent
Nakabayashi

(10) Patent No.: US 8,444,307 B2
(45) Date of Patent: May 21, 2013

(54) VEHICULAR LAMP

(75) Inventor: Masaaki Nakabayashi, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 408 days.

(21) Appl. No.: 12/779,534

(22) Filed: May 13, 2010

(65) Prior Publication Data

US 2010/0296307 A1 Nov. 25, 2010

(30) Foreign Application Priority Data

May 21, 2009 (JP) ................................ 2009-123505

(51) Int. Cl.
*B60Q 1/00* (2006.01)
(52) U.S. Cl.
USPC .......................................... 362/514; 362/523
(58) Field of Classification Search
USPC .................. 362/514, 523, 515, 273, 460, 530, 362/531, 532, 528
See application file for complete search history.

(56) References Cited

U.S. PATENT DOCUMENTS

| | | | |
|---|---|---|---|
| 6,543,916 B2 | 4/2003 | Shirai | |
| 2002/0085385 A1 * | 7/2002 | Shirai | 362/514 |
| 2004/0264208 A1 * | 12/2004 | Nishizawa | 362/514 |

FOREIGN PATENT DOCUMENTS

| | | |
|---|---|---|
| JP | 56-165303 | 5/1980 |
| JP | 2001-256806 A | 9/2001 |

OTHER PUBLICATIONS

English abstract of JP2001256806 published on Sep. 21, 2001, espacenet database, 1 page.

* cited by examiner

*Primary Examiner* — Anh Mai
*Assistant Examiner* — Elmito Breval
(74) *Attorney, Agent, or Firm* — Osha Liang LLP

(57) ABSTRACT

A vehicular lamp includes a lamp unit disposed inside a lamp chamber and an aiming mechanism. The lamp chamber is formed from a lamp body opening forward and a front cover attached to the front opening portion of the lamp body. The aiming mechanism is interposed between the lamp unit and the lamp body. The aiming mechanism performs an optical axis adjustment by tiltably supporting the lamp unit with respect to the lamp body. The aiming mechanism includes a rotational operation portion supported by a lamp body side fixing portion provided on the lamp body; a screw portion threadedly engaged with a lamp unit side fixing portion provided on the lamp unit; and a connection portion that joins the rotational operation portion and the screw portion. At least part of the connection portion has radial flexibility and no axial elasticity. Torque from the rotational operation portion is transmitted to the screw portion to move the lamp unit side fixing portion in the vehicle longitudinal direction.

20 Claims, 7 Drawing Sheets

VEHICULAR LAMP

BACKGROUND OF INVENTION

1. Field of the Invention

The present invention relates to a vehicular lamp having a lamp unit and an aiming mechanism inside a lamp chamber formed from a lamp body and a front cover.

2. Related Art

There is an example of a conventional vehicular lamp in which the aiming mechanism has a synthetic screw, and a synthetic resin nut member that threadedly engages with the screw (see Patent Document 1, for example).

Another example of a conventional vehicular lamp is one in which the aiming mechanism has a flexible wire that fixes the screw, and the screw is inserted into an adapter hole (see Patent Document 2, for example).

[Patent Document 1] Japanese Patent Application Laid-Open (Kokai) No. 2001-256806

[Patent Document 2] Japanese Utility Model Application Publication No. S56-165303

SUMMARY OF INVENTION

In the conventional vehicular lamps above, rotation of the screw adjusts an optical axis and thus changes an angle of a reflector. However, at such time, an offset caused by the eccentricity of the screw cannot be reliably absorbed, making it difficult to adjust the optical axis with high precision during aiming.

One or more embodiments of the present invention provide a vehicular lamp that performs an optical axis adjustment with higher precision over a wide range by reliably absorbing an offset during aiming.

In one or more embodiments of the present invention, a vehicular lamp includes a lamp unit inside a lamp chamber that is formed from a lamp body opening forward and a front cover attached to the front opening portion of the lamp body; and an aiming mechanism that is interposed between the lamp unit and the lamp body, and performs an optical axis adjustment by tiltably supporting the lamp unit with respect to the lamp body. The aiming mechanism includes a rotational operation portion supported by a lamp body side fixing portion provided on the lamp body, a screw portion threadedly engaged with a lamp unit side fixing portion provided on the lamp unit, and a connection portion that joins the rotational operation portion and the screw portion. At least part of the connection portion has radial flexibility and no axial elasticity, and torque from the rotational operation portion is transmitted to the screw portion to move the lamp unit side fixing portion in the vehicle longitudinal direction.

According to the vehicular lamp with the above configuration, rotation of the rotational operation portion rotates the screw portion and tilts the lamp unit. In this case, at least part of the connection portion joined to the screw portion has radial flexibility and no axial elasticity. Therefore, torque from the rotational operation portion is reliably transmitted to the screw portion and a large tilting range can be obtained. Thus, even if the screw portion is offset from eccentricity, the connection portion reliably absorbs the offset and enables high-precision optical axis adjustments over a wide range.

The vehicular lamp with the above configuration preferably further includes a slide mechanism provided between the lamp unit and the lamp body, wherein the slide mechanism moves the lamp unit side fixing portion in the vehicle longitudinal direction.

According to the vehicular lamp with this configuration, the slide mechanism moves the lamp unit side fixing portion in the vehicle longitudinal direction. Therefore, tilting can be performed in a stable manner while the slide mechanism supports the weight of the lamp unit.

In the vehicular lamp with the above configuration, at least one of the screw portion and the rotational operation portion is preferably made of resin, and integrally formed by insert molding using the connection portion as a base.

According to the vehicular lamp with this configuration, at least one of the screw portion and the rotational operation portion is integrally molded by resin insert molding using the connection portion as a base. Therefore, the number of components and man-hours can be markedly reduced compared to when separate components are used.

In the vehicular lamp with the above configuration, at least one of the screw portion and the rotational operation portion is preferably made of metal, and integrated by crimping to the connection portion.

According to the vehicular lamp with this configuration, at least one of the screw portion and the rotational operation portion made of metal is integrated by crimping to the connection portion. Therefore, a demand for high strength can be met.

In the vehicular lamp with the above configuration, an end portion cross-sectional shape of the connection portion is preferably a non-circular shape.

According to the vehicular lamp with this configuration, if a flexible wire or the like having radial flexibility and no axial elasticity is applied to the connection portion, the cross-sectional shape of the end portions of the flexible wire may be formed in a non-circular shape that is an elliptical shape or a polygonal shape such as a quadrangle, for example. Therefore, torque can be reliably transmitted from the rotational operation portion during aiming without slack being generated between the screw portion and the rotational operation portion.

According to a vehicular lamp in accordance with one or more embodiments of the present invention, at least part of a connection portion has radial flexibility and no axial elasticity. Therefore, an offset during aiming can be reliably absorbed to perform an optical axis adjustment with higher precision over a wide range.

Other aspects and advantages of the invention will be apparent from the following description, the drawings and the claims.

DETAILED DESCRIPTION

Figure 1:
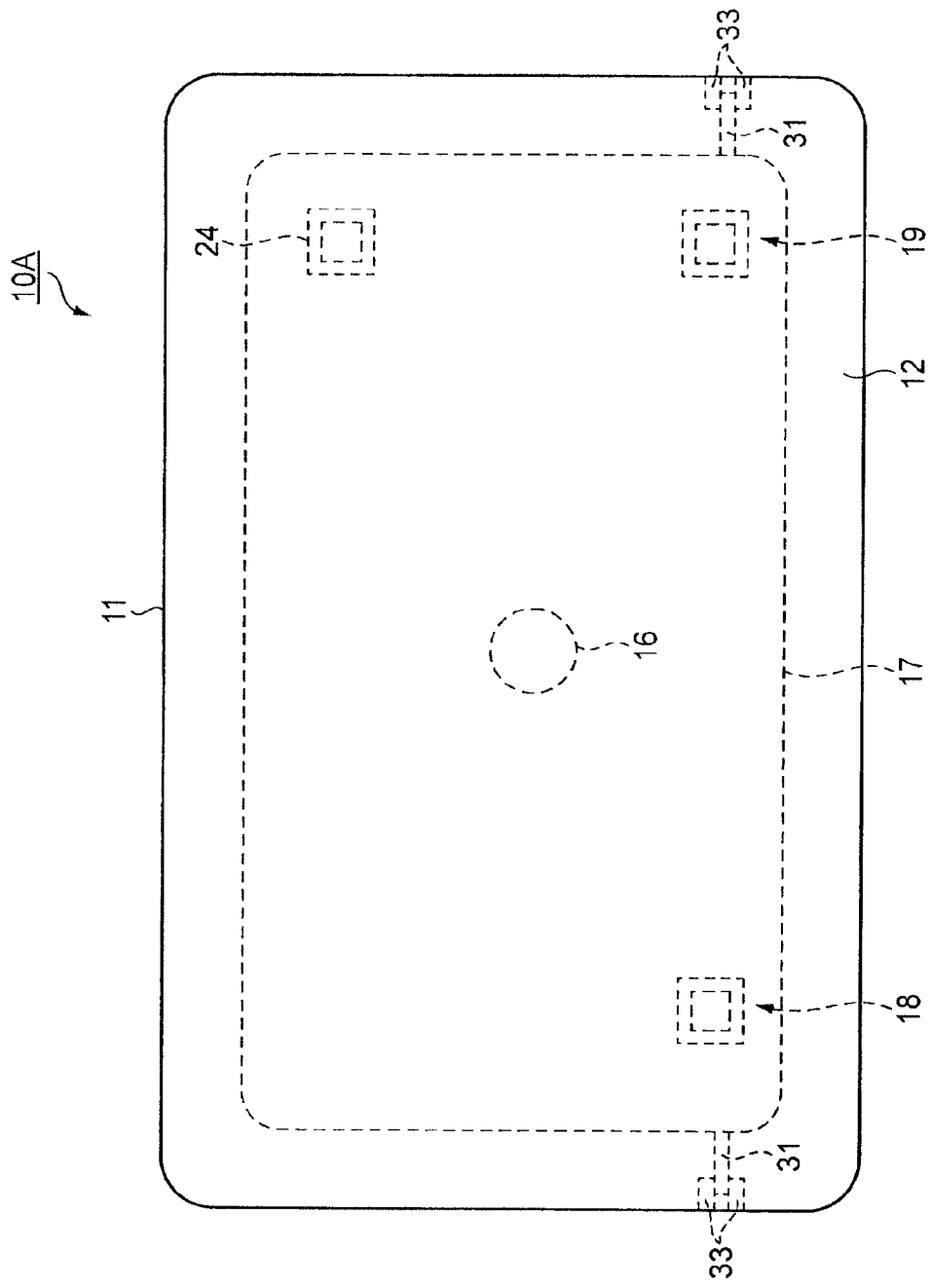
FIG. 1 is a frontal view of a vehicular lamp according to a first embodiment of the present invention.

Hereinafter, embodiments of the present invention will be described with reference to the drawings.

As illustrated in FIGS. 1 to 6, a vehicular lamp 10 according to a first embodiment of the present invention is an automobile headlamp with a mobile reflector. The vehicular lamp 10 includes a resin lamp body 11 that is fixed to a vehicle body side and whose vehicle front side is formed open; a front cover 12 that is attached to a front opening portion 13 of the lamp body 11; and a lamp chamber 14 that is formed from the lamp body 11 and the front cover 12.

Inside the lamp chamber 14 of the vehicular lamp 10, a lamp unit 15 and a first aiming mechanism 18 are provided. The lamp unit 15 has a bulb 16 as a light source and a reflector 17. The first aiming mechanism 18 is interposed between the lamp unit 15 and the lamp body 11, tiltably supports the lamp unit 15 with respect to the lamp body 11, and performs optical axis adjustments in the horizontal direction of the vehicle. Similar to the first aiming mechanism 18, a second aiming mechanism 19 is also provided that performs optical axis adjustments in the vertical direction of the vehicle.

As shown in FIG. 1, the lamp body 11 and the front cover 12 are formed horizontally long in the width direction of the vehicle body.

The first aiming mechanism 18 is disposed in an upper-left portion of the lamp body 11 in the drawing, and the second aiming mechanism 19 is disposed in a lower-right portion of the lamp body 11 in the drawing. Both the aiming mechanisms 18, 19 have identical structures, and, therefore, only the first aiming mechanism 18 will be described.

Figure 2:
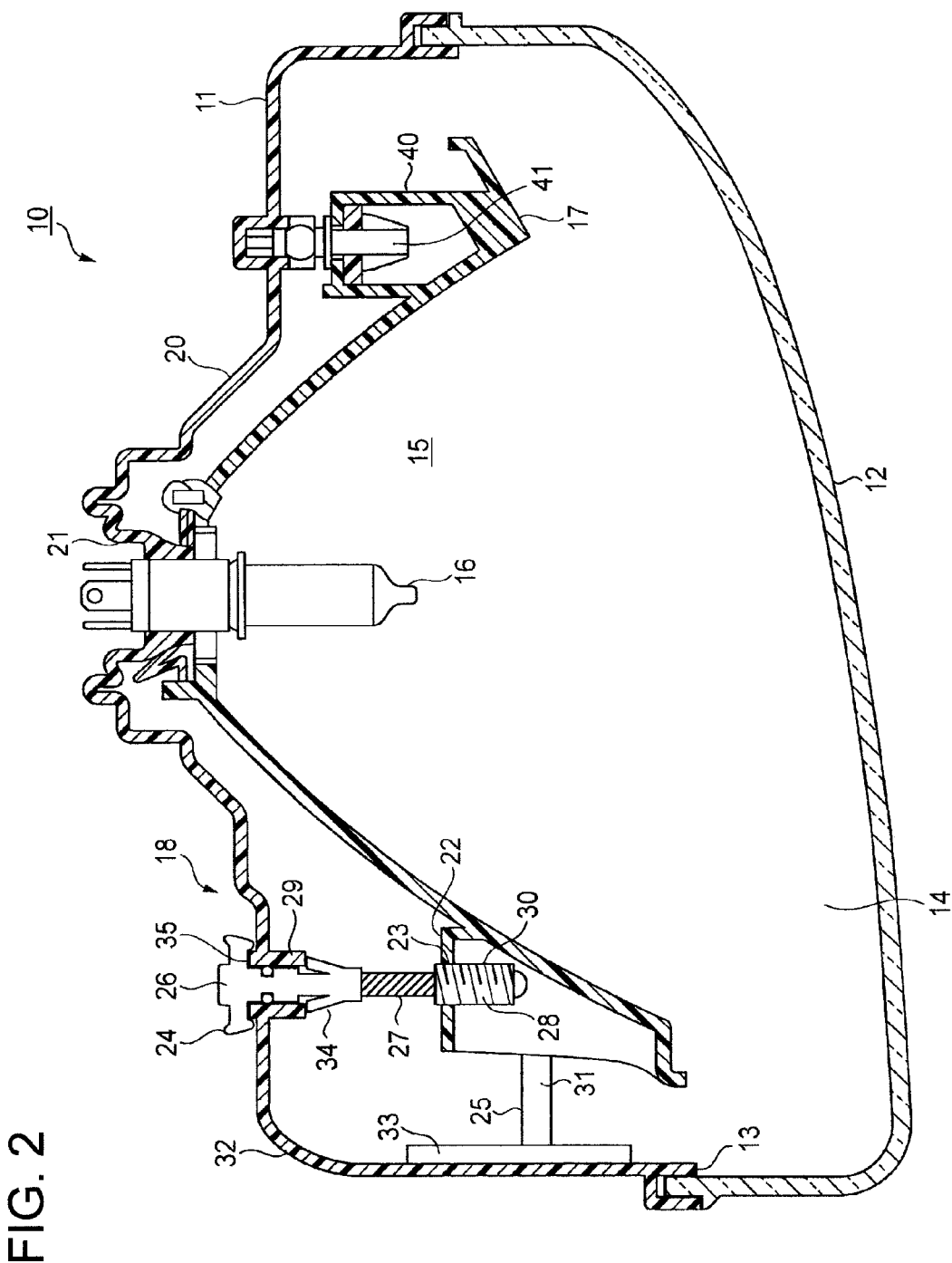
FIG. 2 is a horizontal cross-sectional view of the vehicular lamp in FIG. 1.

As shown in FIG. 2, the lamp body 11 has the front opening portion 13 in front, and may be formed in a box shape using a hard resin material.

A light source installation portion 21 is formed on a generally center portion of a back plate 20 of the lamp body 11, and the reflector 17 is disposed in front of the light source installation portion 21. The bulb 16 is inserted into the reflector 17 and attached to the light source installation portion 21.

The reflector 17 is formed in a rectangular shape and has a curved surface whose nadir is on the bulb 16 side. A first lamp unit side fixing portion 22 that structures a portion of the first aiming mechanism 18 is formed on a side end portion of the back surface of the reflector 17. The first lamp unit side fixing portion 22 has a female screw hole 23 that threadedly engages with a male screw portion 30 of a screw portion 28 described later. Therefore, the first lamp unit side fixing portion 22 does not have a self-locking nut typically used.

The reflector 17 also has a second lamp unit side fixing portion 40 that structures another portion of the first aiming mechanism 18. The second lamp unit side fixing portion 40 is formed at a position opposite the first lamp unit side fixing portion 22. The second lamp unit side fixing portion 40 is connected by a bolt 41 to the back plate 20 of the lamp body 11 through a spherical joint. The second lamp unit side fixing portion 40 functions as a fulcrum during operation of the first aiming mechanism 18.

The first aiming mechanism 18 is formed from an aiming fulcrum 24, a slide mechanism 25, the first lamp unit side fixing portion 22, and the second lamp unit side fixing portion 40. The aiming fulcrum 24 is integrally connected to a rotational operation portion 26, a connection portion 27, and the screw portion 28.

The aiming fulcrum 24 is different from a so-called rigid adjusting screw that is typically used. The connection portion 27 is formed from a metal flexible wire such as a hard steel wire having radial flexibility and no axial elasticity.

The rotational operation portion 26 is rotatably supported on a lamp body side fixing portion 29 that is formed on the back plate 20 of the lamp body 11.

The screw portion 28 is formed with the male screw portion 30. The male screw portion 30 is threadedly engaged with the female screw hole 23 of the first lamp unit side fixing portion 22 of the reflector 17.

In other words, a self-locking nut used to follow the tilt of the reflector 17 during aiming is not employed here, and the screw portion 28 is directly threadedly engaged with the first lamp unit side fixing portion 22. Therefore, the number of components and assembly man-hours can be reduced to achieve a reduction in costs. Furthermore, automatic assembly of the vehicular headlamp is possible.

Note that a larger tilt angle can be employed with the combined use of a self-locking nut, which enables high-precision optical axis adjustments over a wider range.

The slide mechanism 25 is formed from a support shaft 31 that horizontally projects from the first lamp unit side fixing portion 22 of the reflector 17, and a rail portion 33 that is formed on a side plate 32 provided in the lamp body 11.

Figure 3:
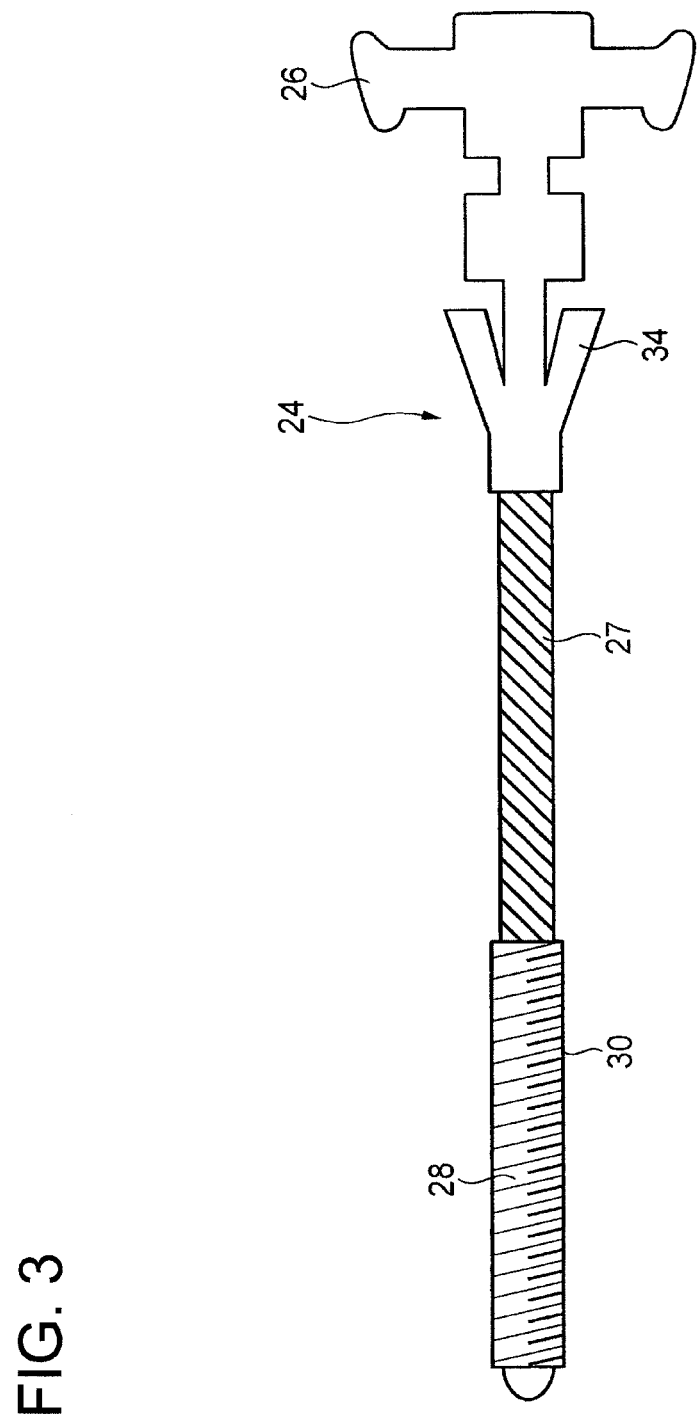
FIG. 3 is a side view of an aiming fulcrum applied to the vehicular lamp in FIG. 1.

As shown in FIG. 3, the aiming fulcrum 24 integrally forms a lance 34 that functions as a fixing member on the screw portion 28 side of the rotational operation portion 26. Because the lance 34 has flexibility, the aiming fulcrum 24 is inserted and mounted after the screw portion 28 from outside in a one-touch manner into the lamp body side fixing portion 29 of the lamp body 11. Thus, the lance 34 abuts against the back plate 20 of the lamp body 11 and can be held in place (see FIG. 2). Therefore, a typically-used fixing member, such as a push on fix, is no longer necessary.

In the aiming fulcrum 24, the rotational operation portion 26 and the screw portion 28 may be made of resin such as an aromatic nylon, and may be integrally formed by insert molding using the metal connection portion 27 as a base.

Note that one of either the rotational operation portion 26 or the screw portion 28 may be made of resin. The connection portion 27 may also be made of resin provided that it has radial flexibility and no axial elasticity. In such case, the rotational operation portion 26 or the screw portion 28 may be integrally formed by two-color molding to an end portion of the connection portion 27.

In the aiming fulcrum 24, the rotational operation portion 26 and the screw portion 28 are made of metal such as SWCH (carbon steel wire for cold heading and cold forging), and integrated by crimping to the metal connection portion 27. Note that one of either the rotational operation portion 26 or the screw portion 28 may be made of metal.

The connection portion 27 is swaged such that a cross-sectional shape of end portions of the connection portion 27 on the rotational operation portion 26 and screw portion 28 to be connected is a non-circular shape that is a polygonal shape such as a quadrangle, for example.

Figure 4:
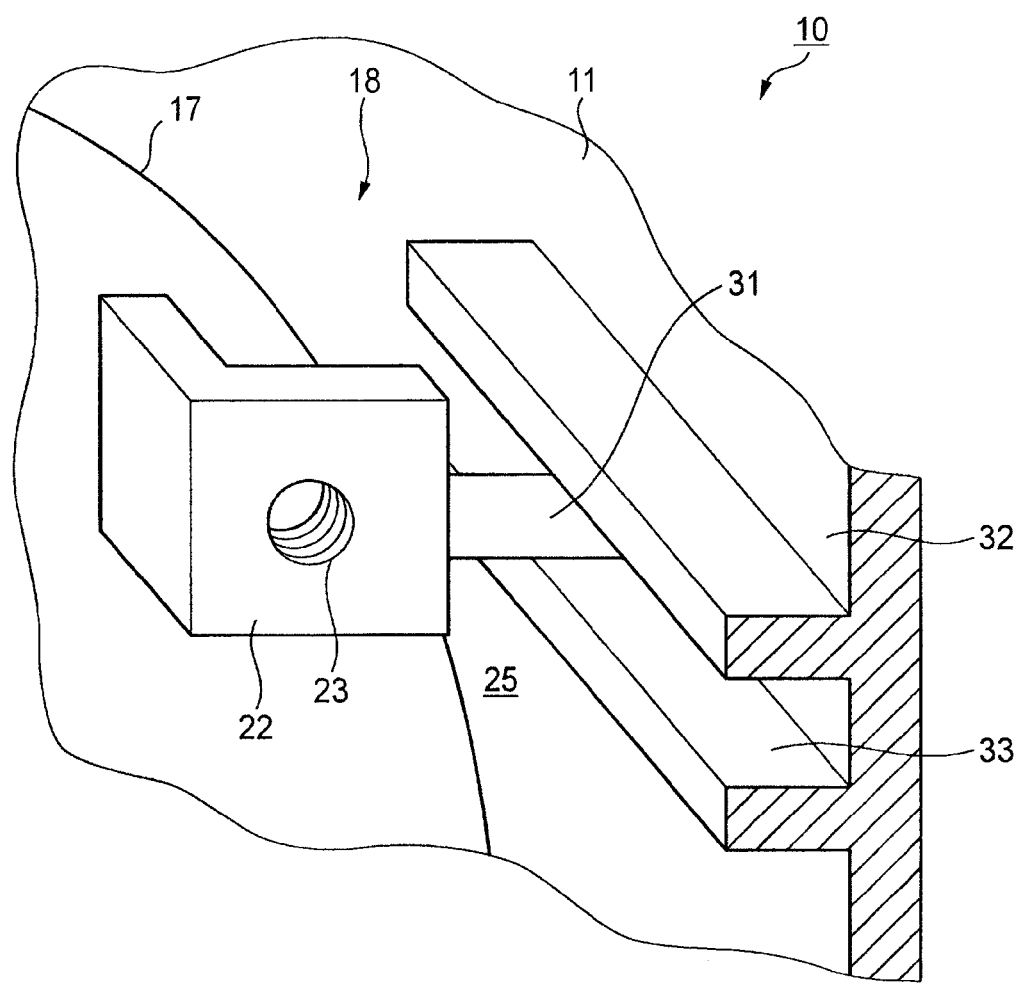
FIG. 4 is a perspective view of a partial exterior cut-out of a slide mechanism of the vehicular lamp in FIG. 1.

As shown in FIG. 4, in the slide mechanism 25, the support shaft 31 is slidably supported on the rail portion 33. In other words, the support shaft 31 can slide in the vehicle longitudinal direction and is restricted from movement in the vertical direction with respect to the vehicle longitudinal direction. Therefore, the weight of the lamp unit 15 can be supported by the lamp body 11 when the aiming operation of the first aiming mechanism 18 is performed and, at normal times, when the aiming operation of the first aiming mechanism 18 is not performed.

Note that the above configuration is particularly effective when the lamp unit is mounted with a projection lens.

Next, the operation of the aiming mechanism 18 in the vehicular lamp 10 will be described with reference to FIG. 5.

Figure 5:
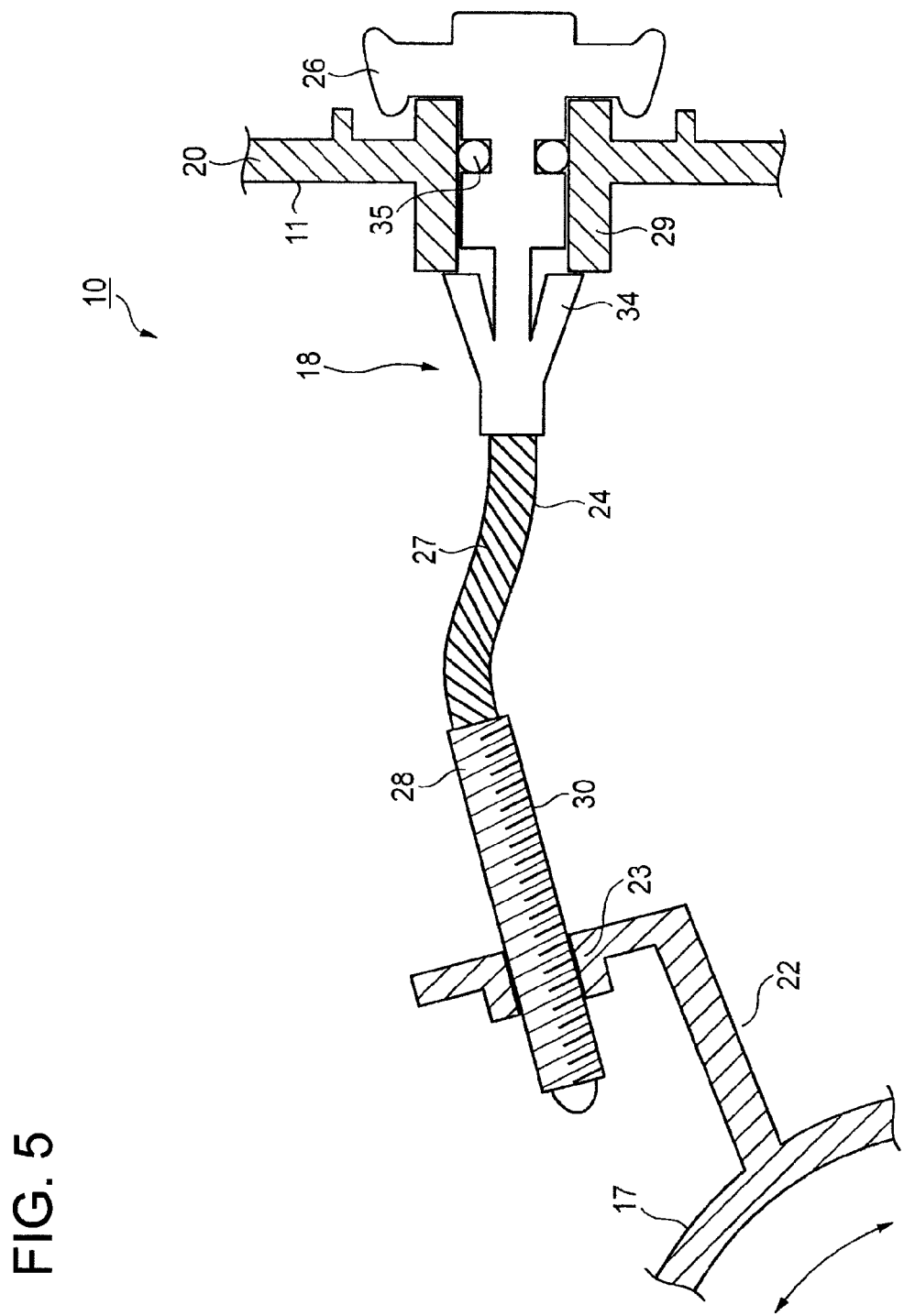
FIG. 5 is a horizontal cross-sectional view of a partial cut-out that describes the operation of an aiming mechanism of the vehicular lamp in FIG. 1.

As shown in FIG. 5, the aiming fulcrum 24 is attached to the lamp body side fixing portion 29 of the lamp body 11.

Also, the aiming fulcrum 24 is made waterproof through the use of an O-ring 35 externally fitted to the rotational operation portion 26.

In the vehicular lamp 10, light radiated from the bulb 16 is reflected by the reflector 17 and irradiated in a set direction forward of the vehicle. A predetermined standard exists regarding the optical axis direction of irradiated light, and optical axis adjustments are performed using the first aiming mechanism 18 at the times of new vehicle shipment and vehicle inspection.

In the first aiming mechanism 18, by rotationally operating the rotational operation portion 26 clockwise or counterclockwise, the connection portion 27 transmits the torque of the rotational operation portion 26 to the screw portion 28, which turns the screw portion 28 to the right or left. At such time, the rotation of the screw portion 28 causes the male screw portion 30 to threadedly engage with the female screw hole 23 of the first lamp unit side fixing portion 22.

While the support shaft 31 of the slide mechanism 25 is slidably supported by the rail portion 33, the reflector 17 is drawn toward the back plate 20 of the lamp body 11 with the second lamp unit side fixing portion 40 acting as a fulcrum point. An optical axis adjustment is thus performed by tilting the lamp unit 15, including the bulb 16 and the reflector 17, with respect to the lamp body 11.

Even if the screw portion 28 is offset from eccentricity at such time, the connection portion 27 bends in the radial direction with respect to the axial direction so as to follow the tilt of the reflector 17 without the use of a self-locking nut, and reliably absorbs the offset (an offset absorption function).

Figure 6:
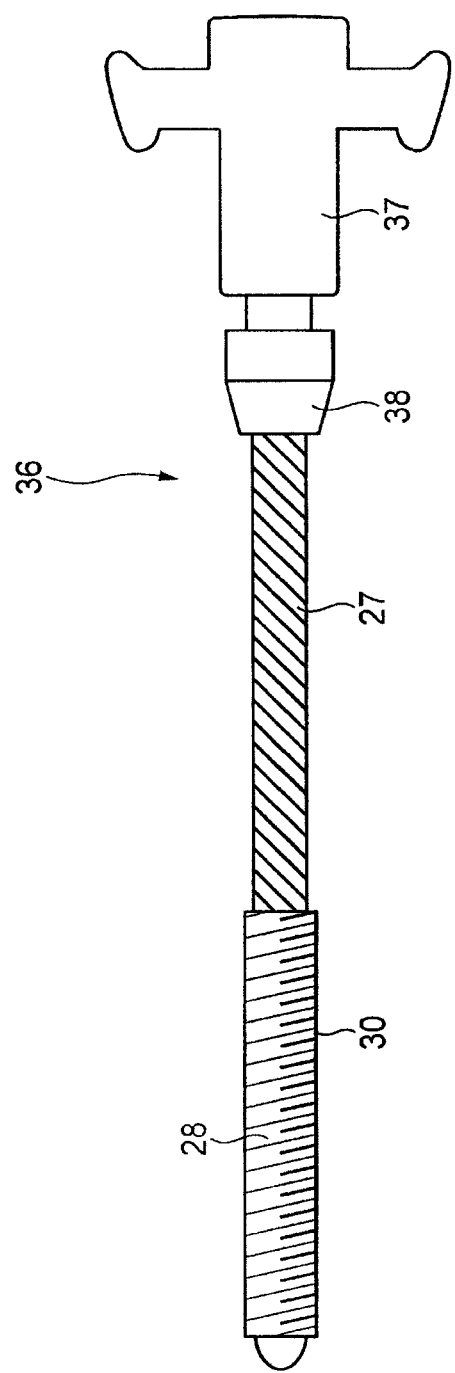
FIG. 6 is a side view of a modification of the aiming fulcrum applied to the vehicular lamp in FIG. 1.

As shown in FIG. 6, an aiming fulcrum 36 is a modification of the aiming fulcrum applied to the vehicular lamp 10 according to an embodiments of the present invention. The aiming fulcrum 36 includes a rotational operation portion 37 that has an end portion on a screw portion 28 side thereof integrally formed with a seal member 38.

The aiming fulcrum 36 of the present modification is pressed and inserted after the screw portion 28 from outside into the lamp body side fixing portion 29 of the lamp body 11. Upon doing so, the seal member 38 abuts against the back plate 20 of the lamp body 11 and can be held in place.

In the vehicular lamp 10 according to the first embodiment of the present invention described above, the rotation of the rotational operation portions 26, 37 rotates the screw portion 28 and causes the lamp unit 15 to tilt. In this case, at least part of the connection portion 27 joined to the screw portion 28 has radial flexibility and no axial elasticity. Therefore, torque from the rotational operation portions 26, 37 is reliably transmitted to the screw portion 28 and a large tilt angle can be obtained. Thus, even if the screw portion 28 is offset from eccentricity, the connection portion 27 reliably absorbs the offset and enables high-precision optical axis adjustments over a wide range.

In addition, the connection portion 27 follows the tilt of the reflector 17 even without the use of a self-locking nut and reliably absorbs the offset. Consequently, automatic assembly of the vehicular headlamp can be realized.

The first lamp unit side fixing portion 22 is moved in the vehicle longitudinal direction by the slide mechanism 25. Therefore, tilting can be performed in a stable manner while the slide mechanism 25 supports the weight of the lamp unit 15.

If at least one of the screw portion 28 and the rotational operation portions 26, 37 is made of resin, one of the screw portion 28 and the rotational operation portions 26, 37 can be integrally formed by resin insert molding using the connection portion 27 as a base. Therefore, the number of components and assembly man-hours can be reduced.

If at least one of the screw portion 28 and the rotational operation portions 26, 37 is made of metal, one of the screw portion 28 and the rotational operation portions 26, 37 can be integrated by crimping to the connection portion 27. Therefore, a demand for high strength can be met.

If a flexible wire having radial flexibility and no axial elasticity is applied to the connection portion 27, the cross-sectional shape of the end portions of the flexible wire may be formed in a non-circular shape that is a polygonal shape such as a quadrangle, for example. Therefore, torque can be reliably transmitted without slack being generated between the screw portion 28 and the rotational operation portions 26, 37.

Next, a vehicular lamp according to a second embodiment of the present invention will be described with reference to FIG. 7. Note that like reference numerals are used for structural members that are identical to those of the first embodiment and will not be described in detail here.

Figure 7:
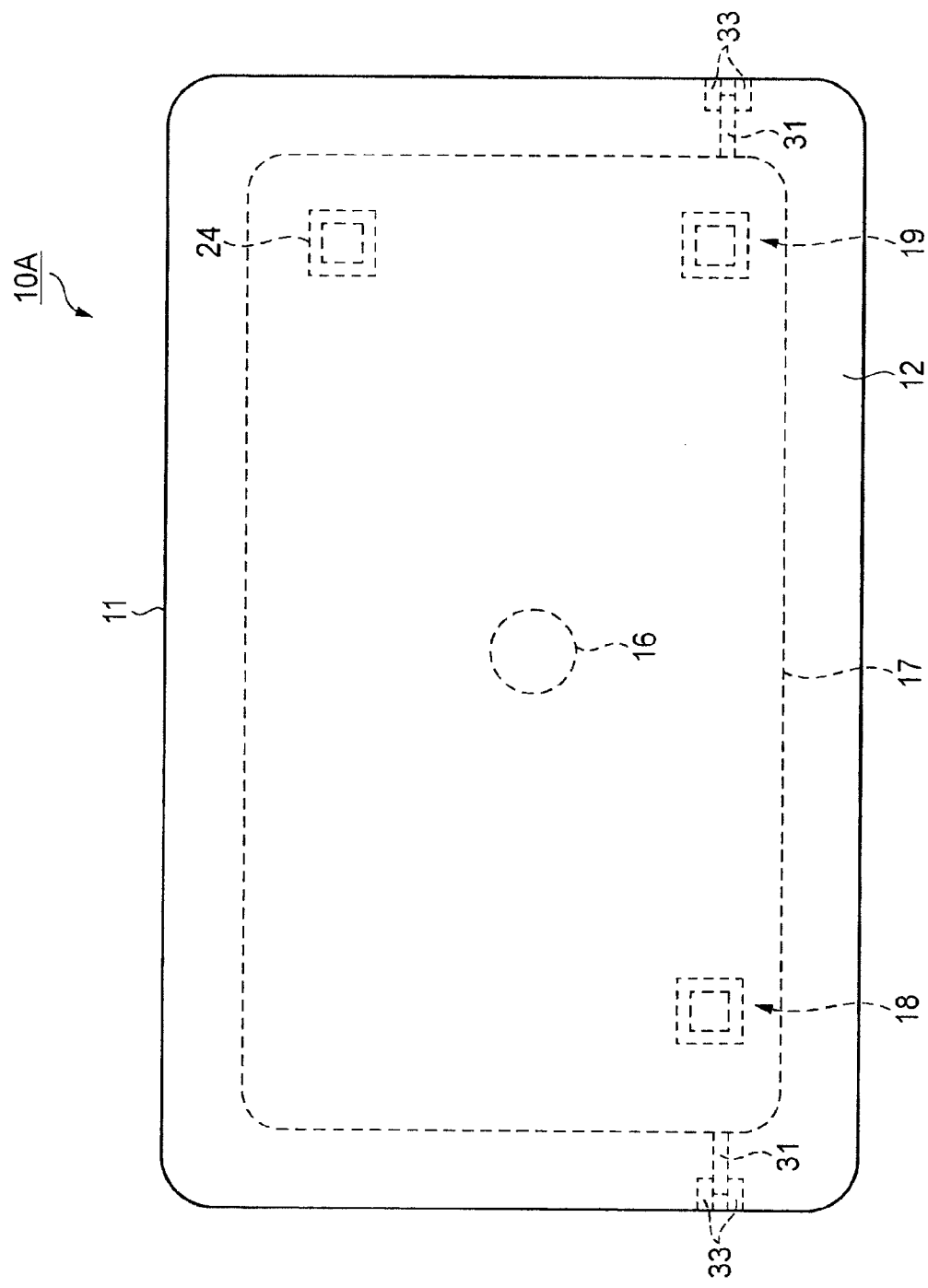
FIG. 7 is a frontal view of a vehicular lamp according to a second embodiment of the present invention.

As shown in FIG. 7, in a vehicular lamp 10A according to the second embodiment of the present invention, the aiming fulcrum 24 is disposed in an upper-right portion of the lamp body 11 in the drawing, and the aiming mechanisms 18, 19 are respectively disposed in lower-right and lower-left portions of the lamp body 11 in the drawing. The first aiming mechanism 18 is operated to perform optical axis adjustments in the horizontal direction of the vehicle. The first aiming mechanism 18 and the second aiming mechanism 19 are simultaneously operated to perform optical axis adjustments in the vertical direction of the vehicle.

In the case of the above layout, the aiming mechanisms 18, 19 are each provided with the slide mechanism 25 (see FIG. 4) so that tilting can be performed in a stable manner while the slide mechanism 25 supports the weight of the lamp unit 15.

Note that the present invention is not limited to the embodiments described above, and may be freely modified, improved, and so forth as appropriate. In addition, the structural elements used in the embodiments described above are not limited in terms of material, shape, dimension, value, form, number, layout, or the like, provided that any structural elements used are capable of achieving the intended functions thereof.

While description has been made in connection with exemplary embodiments of the present invention, it will be obvious to those skilled in the art that various changes and modification may be made therein without departing from the present invention. It is aimed, therefore, to cover in the appended claims all such changes and modifications falling within the true spirit and scope of the present invention.

DESCRIPTION OF THE REFERENCE NUMERALS

10 VEHICULAR LAMP
11 LAMP BODY
12 FRONT COVER
13 FRONT OPENING PORTION
14 LAMP CHAMBER
15 LAMP UNIT
18 FIRST AIMING MECHANISM (AIMING MECHANISM)
19 SECOND AIMING MECHANISM (AIMING MECHANISM)
22 FIRST LAMP UNIT SIDE FIXING PORTION
25 SLIDE MECHANISM
26 ROTATIONAL OPERATION PORTION
27 CONNECTION PORTION

28 SCREW PORTION
29 LAMP BODY SIDE FIXING PORTION
37 ROTATIONAL OPERATION PORTION

What is claimed is:

1. A vehicular lamp comprising:
a lamp unit disposed inside a lamp chamber,
wherein the lamp chamber is formed from a lamp body opening forward and a front cover attached to the front opening portion of the lamp body; and
an aiming mechanism interposed between the lamp unit and the lamp body,
wherein the aiming mechanism performs an optical axis adjustment by tiltably supporting the lamp unit with respect to the lamp body,
wherein the aiming mechanism comprises:
a rotational operation portion supported by a lamp body side fixing portion provided on the lamp body;
a screw portion threadedly engaged with a lamp unit side fixing portion provided on the lamp unit; and
a connection portion that joins the rotational operation portion and the screw portion,
wherein at least part of the connection portion has radial flexibility and no axial elasticity, and
wherein torque from the rotational operation portion is transmitted to the screw portion to move the lamp unit side fixing portion in the vehicle longitudinal direction.

2. The vehicular lamp according to claim 1, further comprising:
a slide mechanism provided between the lamp unit and the lamp body,
wherein the slide mechanism moves the lamp unit side fixing portion in the vehicle longitudinal direction.

3. The vehicular lamp according to claim 2, wherein the slide mechanism comprises:
a support shaft projecting from the lamp unit side fixing portion; and
a rail portion formed on the lamp body,
wherein the rail portion slidably supports the support shaft.

4. The vehicular lamp according to claim 3,
wherein an end portion cross-sectional shape of the connection portion is a non-circular shape.

5. The vehicular lamp according to claim 2,
wherein an end portion cross-sectional shape of the connection portion is a non-circular shape.

6. The vehicular lamp according to claim 1,
wherein at least one of the screw portion and the rotational operation portion is:
made of resin, and
integrally formed by insert molding using the connection portion as a base.

7. The vehicular lamp according to claim 6,
wherein an end portion cross-sectional shape of the connection portion is a non-circular shape.

8. The vehicular lamp according to claim 1,
wherein at least one of the screw portion and the rotational operation portion is:
made of metal, and
integrated by crimping to the connection portion.

9. The vehicular lamp according to claim 8,
wherein an end portion cross-sectional shape of the connection portion is a non-circular shape.

10. The vehicular lamp according to claim 1,
wherein an end portion cross-sectional shape of the connection portion is a non-circular shape.

11. The vehicular lamp according to claim 1 further comprising a plurality of aiming mechanisms.

12. The vehicular lamp according to claim 11,
wherein an end portion cross-sectional shape of the connection portion is a non-circular shape.

13. The vehicular lamp according to claim 1,
wherein at least one of the screw portion and the rotational operation portion is made of resin,
wherein the connection operation portion is:
made of resin, and
integrally formed by two-color molding with the at least one of the screw portion and the rotational operation portion made of resin.

14. The vehicular lamp according to claim 13,
wherein an end portion cross-sectional shape of the connection portion is a non-circular shape.

15. The vehicular lamp according to claim 1, wherein the rotational operation portion of the aiming mechanism comprises:
a lance adapted to fix the aiming mechanism to the lamp body upon insertion of the aiming mechanism into the lamp body.

16. The vehicular lamp according to claim 15,
wherein an end portion cross-sectional shape of the connection portion is a non-circular shape.

17. The vehicular lamp according to claim 1, wherein the rotational operation portion of the aiming mechanism comprises:
a seal member adapted to fix the aiming mechanism to the lamp body upon insertion of the aiming mechanism into the lamp body.

18. The vehicular lamp according to claim 17,
wherein an end portion cross-sectional shape of the connection portion is a non-circular shape.

19. The vehicular lamp according to claim 1, wherein the aiming mechanism further comprises:
an o-ring externally fitted to the rotational operation portion so as to make an interface between the aiming mechanism and the lamp body waterproof.

20. The vehicular lamp according to claim 19,
wherein an end portion cross-sectional shape of the connection portion is a non-circular shape.

* * * * *